(12) United States Patent
Lee

(10) Patent No.: US 6,430,067 B1
(45) Date of Patent: Aug. 6, 2002

(54) VOLTAGE MULTIPLIER FOR LOW VOLTAGE MICROPROCESSOR

(75) Inventor: Lan Lee, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/834,155

(22) Filed: Apr. 12, 2001

(51) Int. Cl.[7] ............................................. H02M 3/18
(52) U.S. Cl. ....................................................... 363/60
(58) Field of Search ...................... 363/59, 60; 327/535, 327/536, 538

(56) References Cited

U.S. PATENT DOCUMENTS

| | | | | |
|---|---|---|---|---|
| 4,344,003 A | * | 8/1982 | Harmon et al. ............. | 307/296 |
| 5,034,875 A | * | 7/1991 | Hattori ........................ | 363/60 |
| 5,302,868 A | * | 4/1994 | Fergus ........................ | 307/491 |
| 5,438,504 A | * | 8/1995 | Menegoli .................... | 363/60 |
| RE35,121 E | * | 12/1995 | Olivo et al. ................. | 363/60 |

* cited by examiner

*Primary Examiner*—Matthew Nguyen
(74) *Attorney, Agent, or Firm*—Rosenthal & Osha L.L.P.

(57) ABSTRACT

A method and apparatus for a voltage multiplier is disclosed that includes a first stage for receiving an input voltage and a first control signal; inverting the first control signal to produce a second control signal; and outputting a first output voltage and the second control signal. The voltage multiplier also includes a second stage for receiving the first output voltage and the second control signal; and outputting a third output voltage. The first output voltage is higher than the input voltage and the second output voltage is higher than the first output voltage.

19 Claims, 4 Drawing Sheets

VOLTAGE MULTIPLIER FOR LOW VOLTAGE MICROPROCESSOR

BACKGROUND OF INVENTION

Computer processors comprise arithmetic, logic, and control circuitry that interpret and execute instructions from a computer program. Referring to FIG. 1, a typical computer system includes a microprocessor (22) having, among other things, a CPU (24), a system controller (26), and an on-chip cache memory (30). The microprocessor (22) is connected to external cache memory (32) and a main memory (34) that both hold data and program instructions to be executed by the microprocessor (22). Internally, the execution of program instructions is carried out by the CPU (24). Data needed by the CPU (24) to carry out an instruction are fetched by the memory controller (26) and loaded into internal registers (28) of the CPU (24). Upon command from the CPU (24) requiring memory data, the fast on-chip cache memory (30) is searched. If the data is not found, then the external cache memory (32) and the slow main memory (34) is searched in turn using the memory controller (26). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from the external cache or the main memory at increased latencies.

In computer and information processing systems, various integrated circuit chips must communicate digitally with each other over common buses. The receiving bus nodes recognize the signal as being high or low using receivers, also referred to as input buffers. Often the receiver is a differential receiver, i.e., a receiver that detects the difference between two input signals, referred to as the differential inputs. These input signals may be a received signal and a reference voltage or they may be a received signal and the inverse of the received signal. In either case, it is the difference between the two input signals that the receiver detects in order to determine the state of the received signal.

Integrated circuits are powered at certain voltage levels, which levels are then provided to the various components, such as the receivers, which are located on the integrated circuit. However, the nominal supply voltage for integrated circuits keeps being decreased to reduce power consumption. Additionally, fluctuations of the voltage level during operation can make the voltage level powering a receiver even lower. The lower the supply voltage, the more challenging it is to get a receiver to operate reliably. Often the operating voltage for the circuit must be generated from a low voltage power supply, e.g., a battery. In order to produce the variance in voltage required by circuit components from these low voltage power supplies, voltage multipliers are used. Typical voltage multipliers consist of diodes coupled across capacitors such that the input voltage is increased every half cycle or full cycle depending on configuration.

SUMMARY OF INVENTION

In general, in one aspect, the present invention involves a voltage multiplier comprising a first stage for receiving an input voltage and a first control signal; inverting the first control signal to produce a second control signal; and outputting a first output voltage and the second control signal. The voltage multiplier further comprises a second stage for receiving the first output voltage and the second control signal; and outputting a third output voltage. The first output voltage is higher than the input voltage and the second output voltage is higher than the first output voltage.

In general, in one aspect, the present invention involves a method of multiplying voltage comprising receiving, in a first stage, an input voltage and a first control signal; inverting, in the first stage, the first control signal to produce a second control signal; and outputting, from the first stage, a first output voltage and a second control signal. The method further comprises receiving, in a second stage, the first output voltage and the second control signal; and outputting a second output voltage. The first output voltage is higher than the input voltage and the second output voltage is higher than the first output voltage.

In general, in one aspect, the present invention involves a voltage multiplier comprising means for receiving, in a first stage, an input voltage and a first control signal; means for inverting, in the first stage, the first control signal to produce a second control signal; and means for outputting, from the first stage, a first output voltage and a second control signal. The voltage multiplier further comprises means for receiving, in a second stage, the first output voltage and the second signal; and means for outputting a second output voltage. The first output voltage is higher than the input voltage and the second output voltage is higher than the first output voltage.

In general, in one aspect, the present invention involves a voltage multiplier comprising a stage that comprises a first inverter for inverting an input voltage; a first transistor; a second transistor; a third transistor; a fourth transistor; a first capacitor; and a second capacitor. The first transistor has a gate and a drain tied together and coupled to a pull-up voltage; and a source coupled to a source of the second transistor. The first capacitor is coupled between the first inverter and the connection of the source of the first transistor and source of the second transistor. The second transistor has a bulk and a source tied together; a drain coupled to a drain of the third transistor; and a gate coupled to a gate of the third transistor and the input voltage. The third transistor has a source coupled to ground. The second capacitor is coupled between a gate of a fourth transistor and the connection between the drain of the second transistor and the drain of the third transistor. A drain of the fourth transistor is coupled to the gate of the fourth transistor. A source of the fourth transistor provides an output voltage.

Other aspects and advantages of the invention will be apparent from the following description and the appended claims.

DETAILED DESCRIPTION

Figure 1:
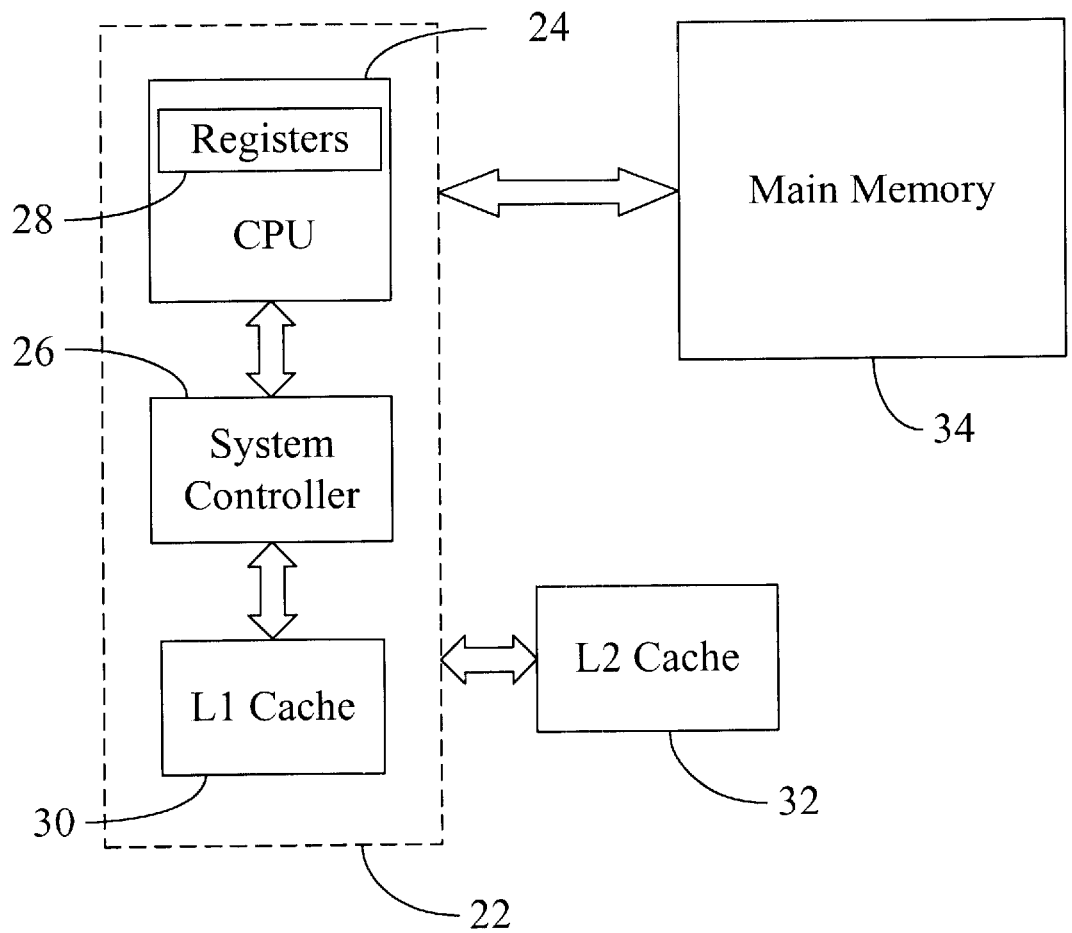
FIG. 1 is a block diagram of a conventional computer system.
Figure 2:
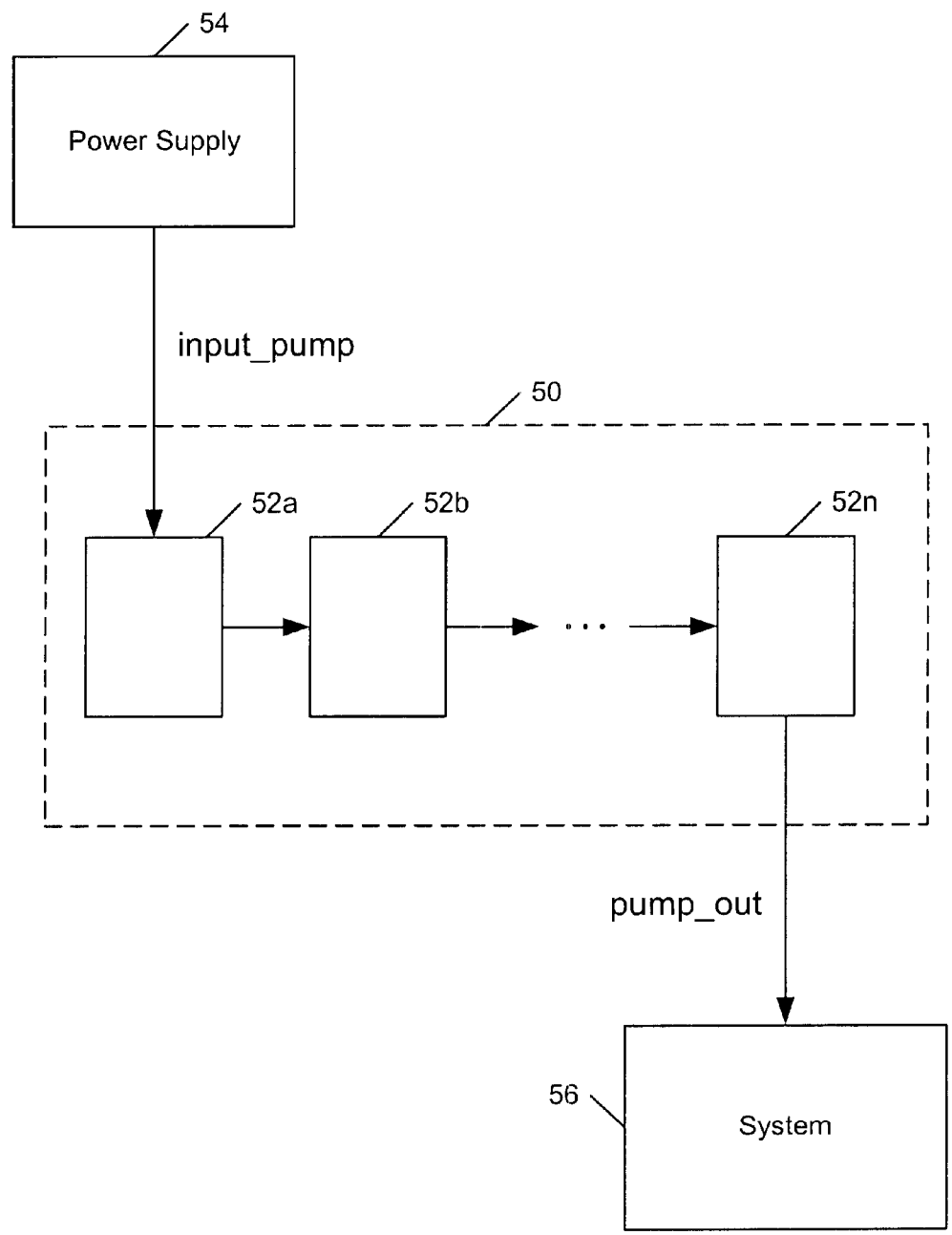
FIG. 2 shows a block diagram of an embodiment of the present invention.

Generally, in one or more embodiments, the invention can be embodied in a voltage multiplier for low voltage microprocessors. Referring to the drawings wherein like reference characters are used for like parts throughout the several views, FIG. 2 shows a block diagram of a system in accordance with an embodiment of the present invention.

The voltage multiplier (50) includes a series of interconnected blocks (52a . . . n) used to increase or "pump" voltage in order to generate a high voltage output (pump$_{13}$ out). The voltage multiplier (50) receives a control signal (input_pump) that controls the operation of the circuit. As can be seen, the control signal (input_pump) is fed into the voltage multiplier (50) from the control block (54) and an output voltage (pump_out) is delivered to the system (56).

The series of blocks (52a . . . n) included in the voltage multiplier (50) is discussed below. First, a general overview of one exemplary block is discussed. Also, the slight variations made to this exemplary block for the first and last block of the series are noted. Following the description of the exemplary block, analysis of the voltage increase derived from each stage (52a . . . n) of the voltage multiplier (50) is included with reference to a schematic showing multiple stages.

Figure 3:
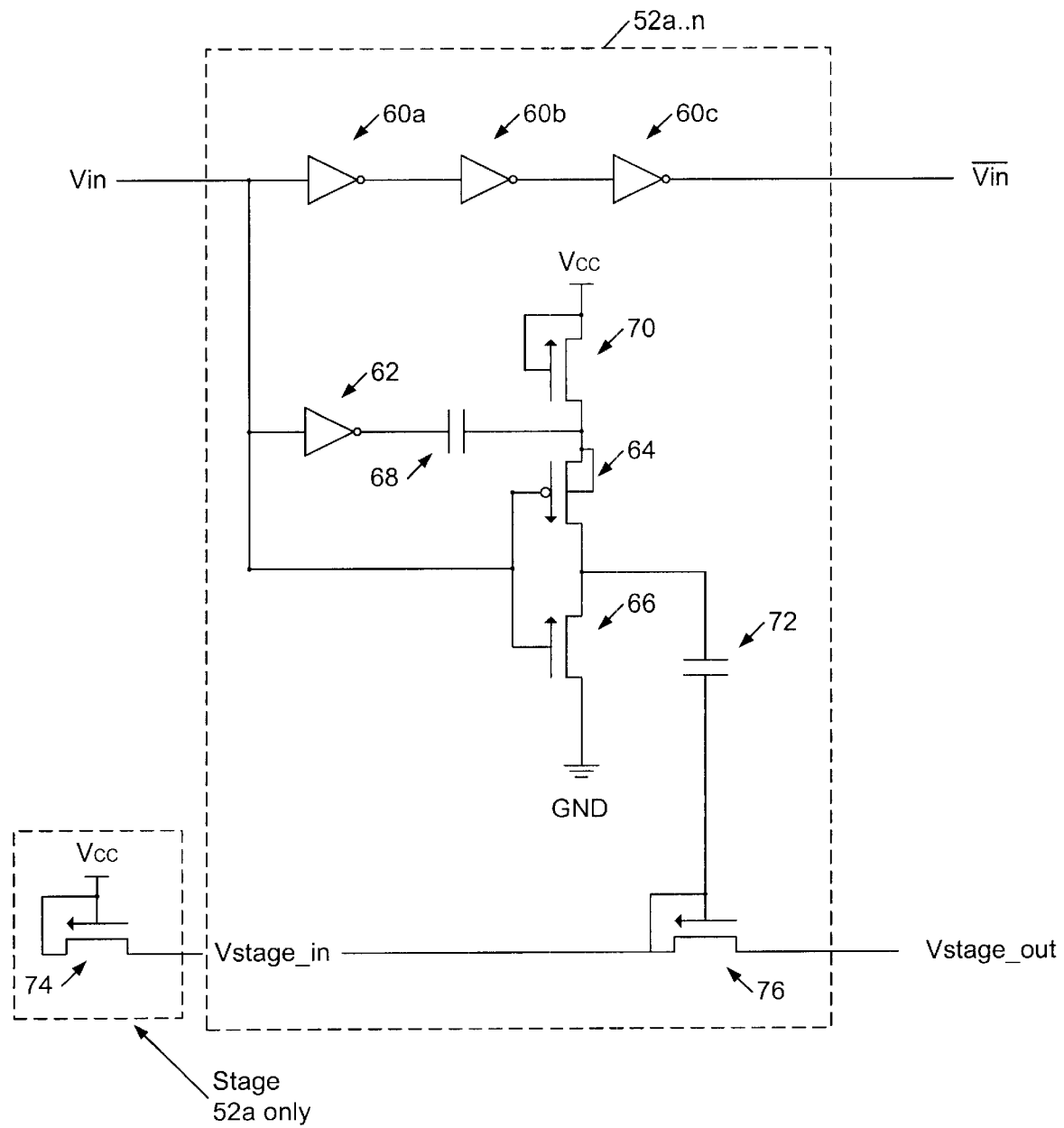
FIG. 3 shows a schematic diagram of an exemplary stage in accordance with an embodiment of the present invention.

Referring to FIG. 3, a schematic diagram of a circuit design of an exemplary stage in accordance with an embodiment of the present invention is shown. As can be seen, generally, each stage (52a . . . n) receives a control signal (Vin). In the first stage (52a), the input signal (Vin) is equal to the voltage (input_pump) supplied by the power supply (54). The control signal (Vin) is delivered to a series of inverters (60a . . . c), an inverter (62), and a pair of coupled transistors, i.e., p-channel transistor (64) and n-channel transistor (66) coupled drain to drain. The series of inverters (60a . . . c) change the polarity of the input voltage (Vin) and outputs the resulting ($\overline{Vin}$) to a subsequent stage (e.g., 52b in FIG. 2). Thus, in every intermediate stage (52b . . . n-1), the control signal (Vin) is the output from the last stage ($\overline{Vin}$). In the last stage (52n), the series of inverters is omitted and there is no output signal ($\overline{Vin}$) produced.

Each stage (52a . . . n) also receives a voltage multiplying signal (Vstage_in) and outputs a voltage (Vstage_out). The voltage (Vstage_in) is supplied by the previous stage and so, in the first stage (52a), the voltage (Vstage_in) is drawn from pull-up voltage (V$_{CC}$) through n-channel transistor (74). Those skilled in the art will appreciate that the entire system includes access to a pull-up voltage and ground, which the shown circuit elements may be additionally connected to in order to function. To compensate for the lack of a previous output voltage, the first stage includes an n-channel transistor (74). The gate and drain of the n-channel transistor (74) are tied together are coupled to pull-up voltage (V$_{CC}$). The source of the n-channel transistor (74) is coupled to the n-channel transistor (76). In the last stage (52n), the output voltage of the stage (Vstage_out) is the voltage (pump_out) output to the system (56).

In each stage (52a . . . n), an inverter (62) is coupled via a capacitor (68) to the gates of two coupled transistors, i.e., the n-channel transistor (70) and the p-channel transistor (64). The gate and drain of n-channel transistor (70) are tied together and coupled to a pull-up voltage (V$_{CC}$). The bulk and source of p-channel transistor (64) are tied together and coupled to the drain of n-channel transistor (70). The gate of p-channel transistor (64) is coupled to the gate of n-channel transistor (66). The connected drains of the p-channel transistor (64) and the n-channel transistor (66) are coupled via a capacitor (72) to the gate of n-channel (76). The source of n-channel transistor (66) is coupled to ground (GND). The gate and drain of the n-channel transistor (76) are tied together and receive the input voltage (Vstage_in). The source of the n-channel transistor (76) the voltage (Vstage_out).

Figure 4:
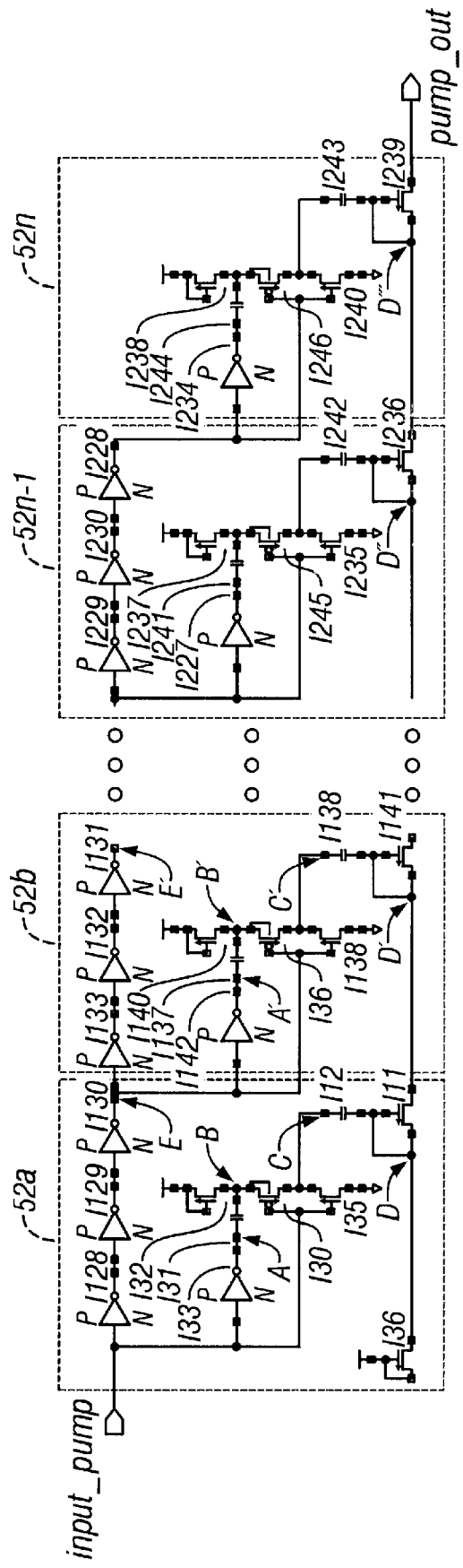
FIG. 4 shows a schematic diagram of an exemplary series of stages in accordance with an embodiment of the present invention.

Referring to FIG. 4, an exemplary schematic of the series of stages (52a), (52b), (52n-1), and (52n) are shown. As can be seen, the first stage (52a) does not receive a voltage multiplying signal (Vstage$_{13}$ in) and the last stage (52n) does not include the inverter set (60a . . . c) used to produce output voltage ($\overline{Vin}$). Otherwise, the intermediate stages (52b . . . 52n-1) have the same configuration. An increase in voltage is produced by each stage. This can be illustrated by looking at the voltages present at nodes A, B, C, D, E for each stage as described below. For simplicity, the analysis does not account for leakage current, i.e., no loss of charge is included in the calculations below.

At initial condition, the input voltage (input_pump) is equal to Vcc and node A is equal to Vss. Node B is equal to Vcc–V$_T$ because the gate and drain of n-channel transistor (I32) are connected to Vcc, the p-channel transistor (I30) is off (because its gate is at (Vcc), and the gate and source of p-channel transistor are tied together. Node C is equal to Vss because the gate of n-channel transistor (I35) is at Vcc. Node D is equal to Vcc–V$_T$ because the gate and drain of n-channel transistor (I36) are at Vcc. Node E is equal to Vss and Node A' is equal to Vcc. Node B' is equal to Vcc–V$_T$. Node C' is equal to VCC–V$_T$ because p-channel transistor (I36) is on and Node D' is equal to Vcc–2V$_T$.

When the input voltage transitions from Vcc to Vss, Node A changes to Vcc. Node B is equal to 2Vcc–V$_T$ because the potential of capacitor (I31) cannot change instantly, and the n-channel transistor (I32) is in a diode configuration and does not allow charge to flow back to its drain. Node C potential transitions from Vss to 2Vcc–V$_T$ because the p-channel transistor (I30) is on (because its gate is at Vss) and the n-channel transistor (I35) is off. Node D transitions from Vcc–V$_T$ to 3Vcc–2V$_T$ (i.e., Vcc–V$_T$ of Node D+2Vcc–V$_T$ of Node C) because the potential across capacitor (I12) cannot change instantly. Thus, Node D' transitions to 3Vcc–3V$_T$ because the n-channel transistor (I11) is at 3Vcc–2V$_T$ (i.e., Node D' is equal to 3Vcc–2V$_T$ of n-channel transistor (I11) minus V$_T$). Node E is equal to Vcc and Node A' is equal to Vss. Node B' is equal to Vcc–V$_T$ because n-channel transistor (I40) is in a diode configuration and allows charge to flow through. Node C' is equal to Vss because n-channel transistor (I139) is on (because its gate is at Vcc). The above process continues through each stage. Thus, the voltage increases at Node D', Node D'', Node D''', and the last stage (52n), where the increased voltage (pump_out) is passed to the system (56).

Advantages of the present invention may include one or more of the following. In one or more embodiments, the present invention boosts operating voltage quickly. Further, the disclosed circuit is effective in providing supply voltages for circuits in low voltage microprocessors. Voltage can be increased significantly before the number of stages is limited. Also, in order to get higher current output, one or more stages can be connected in parallel.

It is important to get C, C', . . . Cn to swing at a large potential. For this circuit, C (Cn) swing between 2Vcc–Vt to Vss (ground), which is outside of the supply voltage (Vcc/Vdd). This is advantageous because, with a large voltage swing at C (Cn), more charge passes to the next stage. Passing more charge to next stage results in higher voltage at the output and higher current at the output at an any given time than conventional circuits. Also, the circuit has improved speed because output gets to the higher voltage in fewer stages due to the higher voltage swing per stage. Further, the output delivers more current per stage than conventional circuits.

Inverters (60*a*, 60*b*, 60*c*) at the top of each stage serves two purposes: delay and driving strength. It is important to have appropriate time for charge to be transferred from D to D' (D' to D", etc.). If C' switches too quickly, the circuit is not as efficient. That is, if the voltage at D' is higher than the voltage at D, charge at D cannot pass to D'. Thus, inverters are included to match delay and strength.

Inverter 60*c* at the end of each stage needs to have enough strength to drive the two inverters connected to its output, i.e., the two inverters in the next stage. If the slew rate (in either high to low or low to high transition) is too shallow, voltage coupling from C to D is not as efficient. Thus, in one or more embodiments, the slew rate at E is sharp. The inclusion of inverters in each stage and transistors to drive the coupling capacitor, allows a single input to be passed from stage to stage. Also, the slew rate of the voltage pump is improved. One skilled in the art will appreciate that a different number of inverters may be included depending on the delay and strength being matched.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A voltage multiplier comprising:
    A first stage for
        receiving an input voltage and a first control signal;
        inverting the first control signal to produce a second control signal;
        outputting a first output voltage and the second control signal;
    A second stage for
        receiving the first output voltage and the second control signal; and
        outputting a third output voltage;
    wherein the first output voltage is higher than the input voltage and the second
        output voltage is higher than the first output voltage.

2. The voltage multiplier of claim 1 wherein the second stage is further for
    inverting the second control signal to produce a third control signal; and
    outputting the third control signal,
the voltage multiplier further comprising:
    A third stage for
        receiving the second output voltage and the third control signal; and
        outputting a third output voltage
            wherein the third output voltage is higher than the second output voltage.

3. A method of multiplying voltage comprising:
    receiving, in a first stage, an input voltage and a first control signal;
    inverting, in the first stage, the first control signal to produce a second control signal;
    outputting, from the first stage, a first output voltage and a second control signal;
    receiving, in a second stage, the first output voltage and the second control signal; and outputting a second output voltage;
    wherein the first output voltage is higher than the input voltage and the second output voltage is higher than the first output voltage.

4. The method of claim 3 further comprising:
    inverting, in the second stage, the second control signal to produce a third control signal;
    outputting, from the second stage, the third control signal;
    receiving, in a third stage, the second output voltage and the third control signal; and
    outputting, from the third stage, a third output voltage,
    wherein the third output voltage is higher than the second output voltage.

5. A voltage multiplier comprising:
    means for receiving, in a first stage, an input voltage and a first control signal;
    means for inverting, in the first stage, the first control signal to produce a second control signal;
    means for outputting, from the first stage, a first output voltage and a second control signal;
    means for receiving, in a second stage, the first output voltage and the second control signal; and
    means for outputting a second output voltage;
    wherein the first output voltage is higher than the input voltage and the second output voltage is higher than the first output voltage.

6. The voltage multiplier of claim 5 further comprising:
    means for inverting, in the second stage, the second control signal to produce a third control signal;
    means for outputting, from the second stage, the third control signal,
    means for receiving, in a third stage, the second output voltage and the third control signal; and
    means for outputting, from the third stage, a third output voltage,
    wherein the third output voltage is higher than the second output voltage.

7. A voltage multiplier comprising a stage comprising:
    a first inverter for inverting an input voltage;
    a first transistor having
        a gate and a drain tied together and coupled to a pull-up voltage; and
        a source coupled to a source of a second transistor;
    a first capacitor coupled between the first inverter and the connection of the source of the first transistor and source of the second transistor;
    the second transistor having
        a bulk and a source tied together;
        a drain coupled to a drain of a third transistor; and
        a gate coupled to a gate of the third transistor and the input voltage;
    the third transistor having
        a source coupled to ground;
    a second capacitor coupled between a gate of a fourth transistor and the connection between the drain of the second transistor and the drain of the third transistor;
    a drain of the fourth transistor coupled to the gate of the fourth transistor; and
    a source of the fourth transistor providing an output voltage.

8. The stage of the voltage multiplier of claim 7, further comprising:

a fifth transistor having
  a gate and a drain tied together and coupled to a pull-up voltage; and
  a source coupled to the connection of the gate and drain of the fourth transistor.

9. The stage of the voltage multiplier of claim 8, further comprising:
  a second inverter for inverting the input voltage and providing a stage voltage.

10. The voltage multiplier of claim 9, further comprising a second stage comprising:
  a first inverter for inverting the stage voltage;
  a first transistor having
    a gate and a drain tied together and coupled to a pull-up voltage; and
    a source coupled to source of a second transistor;
  a first capacitor coupled between the first inverter and the connection of the source of the first transistor and source of the second transistor;
  the second transistor having
    a bulk and a source tied together;
    a drain coupled to a drain of a third transistor; and
    a gate coupled to a gate of the third transistor and the stage voltage;
  the third transistor having
    a source coupled to ground;
  a second capacitor coupled between a gate of a fourth transistor and the connection between the drain of the second transistor and the drain of the third transistor;
  a drain of the fourth transistor coupled to the gate of the fourth transistor and the output voltage; and
  a source of the fourth transistor providing a second output voltage.

11. The second stage of the voltage multiplier of claim 10, further comprising:
  a second inverter for inverting the stage voltage and providing a second stage voltage.

12. voltage multiplier of claim 11, further comprising a third stage comprising:
  a first inverter for inverting the second stage voltage;
  a first transistor having
    a gate and a drain tied together and coupled to a pull-up voltage; and
    a source coupled to source of a second transistor;
  a first capacitor coupled between the first inverter and the connection of the source of the first transistor and source of the second transistor;
  the second transistor having
    a bulk and a source tied together;
    a drain coupled to a drain of a third transistor; and
    a gate coupled to a gate of the third transistor and the second stage voltage;
  the third transistor having
    a source coupled to ground;
  a second capacitor coupled between a gate of a fourth transistor and the connection between the drain of the second transistor and the drain of the third transistor;
  a drain of the fourth transistor coupled to the gate of the fourth transistor and the second output voltage; and
  a source of the fourth transistor providing a third output voltage.

13. The stage of the voltage multiplier of claim 9, wherein the second inverter is a plurality of inverters.

14. The second stage of the voltage multiplier of claim 13, wherein the second inverter is a set of three inverters.

15. The second stage of the voltage multiplier of claim 11, wherein the second inverter is a plurality of inverters.

16. The second stage of the voltage multiplier of claim 15, wherein the second inverter is a set of three inverters.

17. The voltage multiplier of claim 1, wherein the first stage and the second stage contain identical components.

18. The voltage multiplier of claim 3, wherein the first stage and the second stage contain identical components.

19. The voltage multiplier of claim 5, wherein the first stage and the second stage contain identical components.

* * * * *

UNITED STATES PATENT AND TRADEMARK OFFICE
CERTIFICATE OF CORRECTION

PATENT NO.    : 6,430,067 B1
DATED         : August 6, 2002
INVENTOR(S)   : Lan Lee It is certified that error appears in the above-identified patent and that said Letters Patent is hereby corrected as shown below:

Column 2,
Line 27, place the word -- control -- between the words "second" and "signal".

Column 3,
Line 65, place the word -- transistor -- after the "work n-channel".

Column 7,
Line 40, place the word -- The -- at the beginning of the claim.

Signed and Sealed this

Thirty-first Day of December, 2002

JAMES E. ROGAN
*Director of the United States Patent and Trademark Office*